US006789954B2

United States Patent
Lampert et al.

(10) Patent No.: US 6,789,954 B2
(45) Date of Patent: Sep. 14, 2004

(54) ROBUST FIBER CONNECTOR

(75) Inventors: Norman R. Lampert, Norcross, GA (US); Yu Lu, Norcross, GA (US); Naif T. Subh, Lawrenceville, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/243,284

(22) Filed: Sep. 13, 2002

(65) Prior Publication Data

US 2004/0052474 A1 Mar. 18, 2004

(51) Int. Cl.[7] .................................................. G02B 6/36
(52) U.S. Cl. ......................................................... 385/78
(58) Field of Search .............................. 385/76–78, 81, 385/84–89, 92, 139, 55–56, 60

(56) References Cited

U.S. PATENT DOCUMENTS

| | | | |
|---|---|---|---|
| 4,738,507 A | | 4/1988 | Palmquist |
| 4,798,322 A | | 1/1989 | Bernstein et al. |
| 5,097,257 A | | 3/1992 | Clough et al. |
| 5,394,503 A | | 2/1995 | Dietz, Jr. et al. |
| 5,481,634 A | | 1/1996 | Anderson et al. |
| 5,712,938 A | * | 1/1998 | Lin et al. ........................ 385/78 |
| 6,019,520 A | * | 2/2000 | Lin et al. ........................ 385/78 |
| 6,155,146 A | | 12/2000 | Andrews et al. |
| 6,287,018 B1 | * | 9/2001 | Andrews et al. ............... 385/78 |
| 6,416,233 B2 | * | 7/2002 | Shirakawa ..................... 385/78 |

OTHER PUBLICATIONS

U.S. patent application Ser. No. 09/811,074, Lampert et al., filed Mar. 16, 2001.

* cited by examiner

Primary Examiner—Javaid H. Nasri
(74) Attorney, Agent, or Firm—Thomas, Kayden, Horstemeyer & Risley, LLP

(57) ABSTRACT

A pull-proof optical fiber connector for use with robust optical fiber has a housing and a ferrule bearing barrel member therein having a first outside diameter over a front portion thereof and a second, lesser outside diameter rearward portion, and a bore extending therethrough forming an optical fiber passage.

The barrel member and, hence, the ferrule are rearwardly movable under axially pulling stress, and a stop member prevents further rearward movement prior to any disengagement of the ferrule with an associated ferrule or other apparatus. In one embodiment of the invention, the stop member is a fiber retention member having a front face and a bore extending therethrough of lesser diameter than the outside diameter of the second portion, thereby halting rearward movement when the end of the second portion butts against the front face of the cable retention member.

In another embodiment of the invention the stop member is the rear edge of a substantially rectangular opening in the housing, which functions to block a U-shaped retainer member which embraces the second portion of the barrel after allowable rearward movement under rearward axial stress.

10 Claims, 6 Drawing Sheets

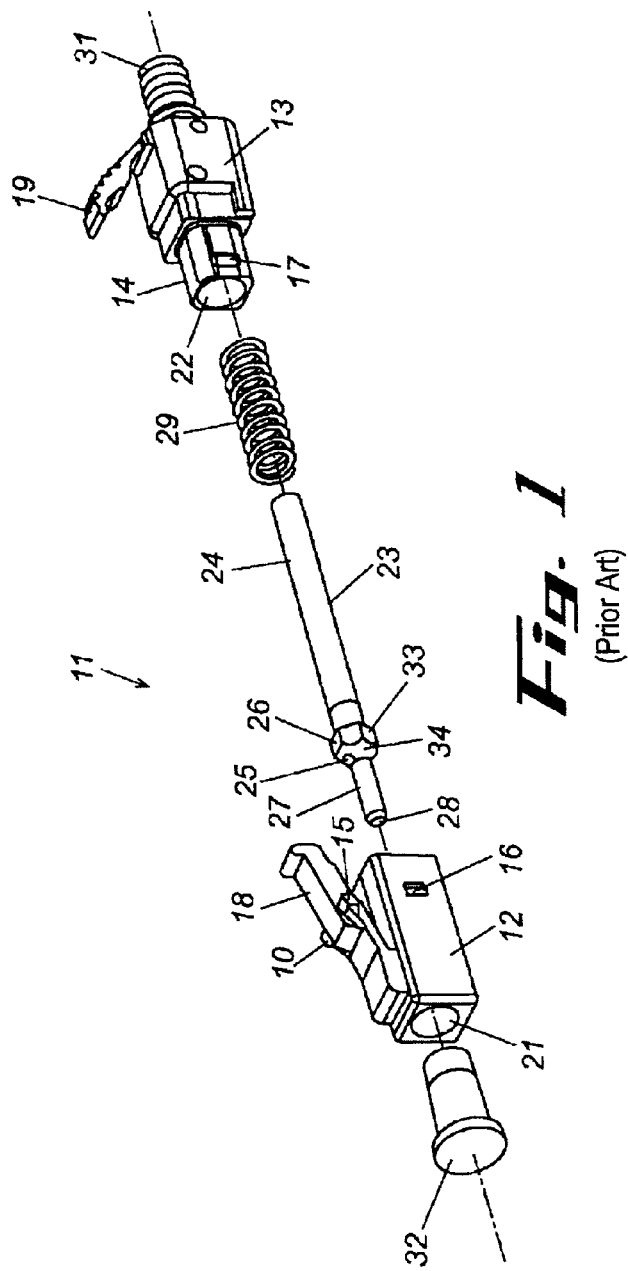
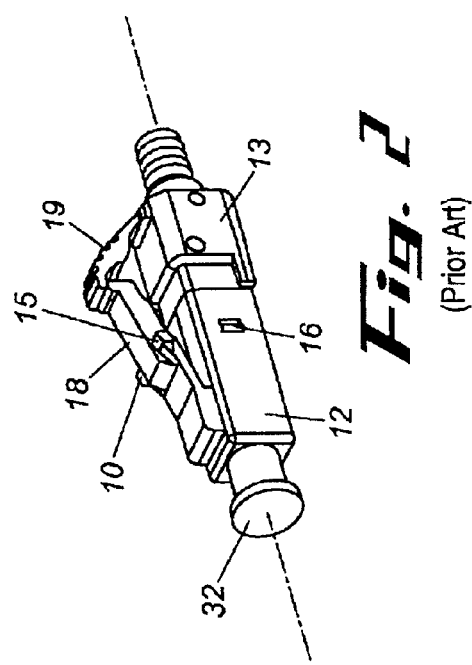
Fig. 1
(Prior Art)
Fig. 2
(Prior Art)

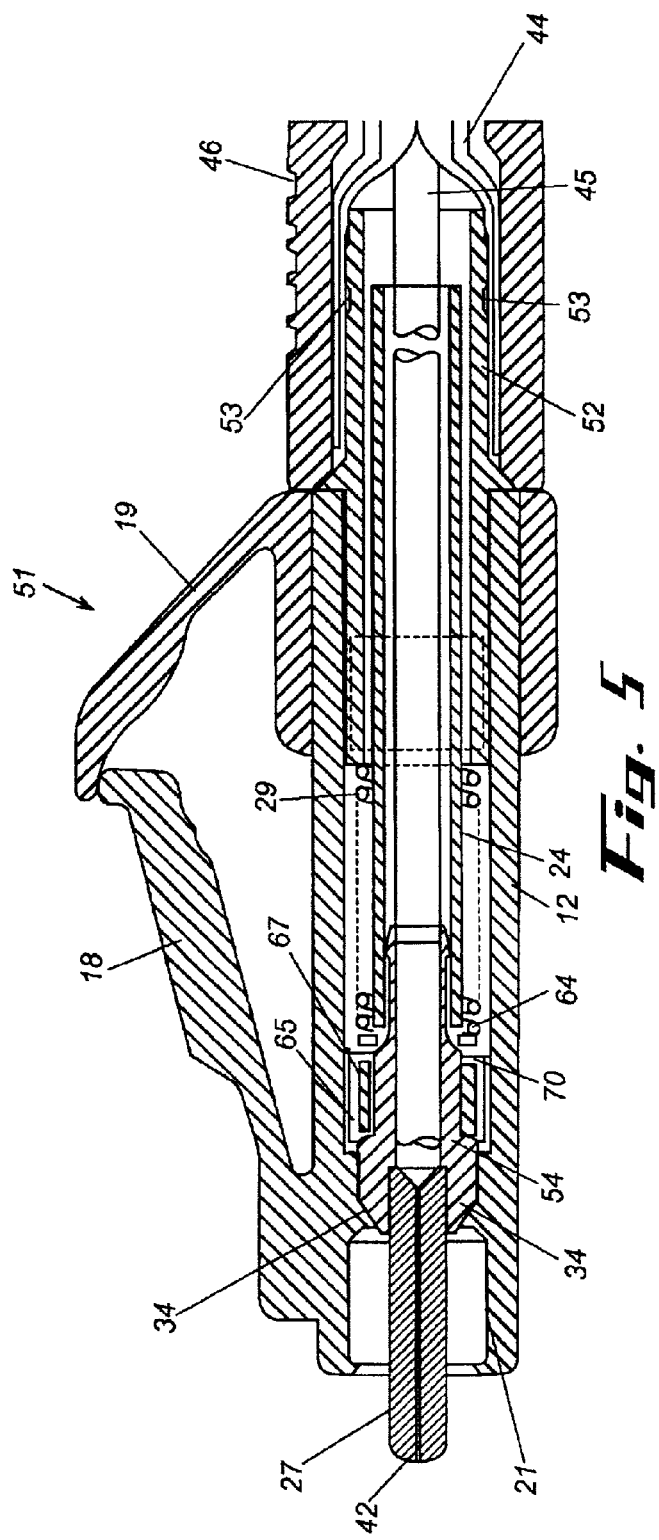

ROBUST FIBER CONNECTOR

FIELD OF THE INVENTION

This invention relates to optical fiber connectors, and, more particularly, to an optical fiber connector for use with robust optical fiber.

BACKGROUND OF THE INVENTION

In optical fiber communications, connectors for joining fiber segments at their ends, or for connecting optical fiber cables to active or passive devices, are an essential component of virtually any optical fiber system. The connector or connectors, in joining fiber ends, for example, has, as its primary function, the maintenance of the ends in a butting relationship such that the core of one of the fibers is axially aligned with the core of the other fiber so as to maximize light transmissions from one fiber to the other. Another goal is to minimize back reflections. Such alignment is extremely difficult to achieve, which is understandable when it is recognized that the mode field diameter of, for example, a singlemode fiber is approximately nine (9) microns (0.009 $\mu$m.) Good connection (low insertion loss) of the fiber ends is a function of the alignment, the width of the gap (if any) between the fiber ends, and the surface condition of the fiber ends, all of which, in turn, are inherent in the particular connector design. The connector must also provide stability and junction protection and thus it should minimize thermal and mechanical movement effects.

In the present day state of the art, there are numerous, different, connector designs in use for achieving low insertion loss and stability. In most of these designs, a pair of ferrules (one in each connector), each containing an optical fiber end, are butted together end to end within a connector adapter and light travels across the junction. Zero insertion loss requires that the fibers in the ferrules be exactly aligned, a condition that, given the necessity of manufacturing tolerances and cost considerations, is virtually impossible to achieve, except by fortuitous accident. As a consequence, most connectors are designed to achieve a useful, preferably predictable, degree of alignment, some misalignment being acceptable.

Alignment variations between a pair of connectors are most often the result of the offset of the fiber core centerline from the ferrule centerline. This offset, which generally varies from connector to connector, is known as "eccentricity", and is defined as the distance between the longitudinal centroidal axis of the ferrule at the end face thereof and the centroidal axis of the optical fiber core held within the ferrule passage.

There are numerous arrangements in the prior art for "tuning" a connector, generally by rotation of its ferrule, to achieve an optimum direction of its eccentricity. One such arrangement is shown in U.S. Pat. No. 5,481,634 of Anderson et al, wherein the ferrule is held within a base member which may be rotated to any of four rotational or eccentricity angular positions. In U.S. Pat. No. 4,738,507 of Palmquist there is shown a different arrangement and method for positioning two connectors relative to each other for minimum insertion loss or maximum coupling. In U.S. Pat. No. 6,155,146 of Andrews, et al. there is shown still another arrangement for tuning a coupler, in which the ferrule, which is mounted in a barrel having a front flange member having six positions of rotation, can be rotated to that one of the six positions producing the most favorable result. In U.S. Pat. No. 6,663,293 of Lampert and Lewis, issued Dec. 16, 2003, another tunable optical fiber connector is shown.

In virtually all such connectors, stability arid resistance to various types of mechanical stress, such as, for example, an accidental "pull" stress on the cable, or other stresses which, conceivably can disrupt the tuning, are highly desirable, if not essential to proper operation of the connector. This is especially true of jumper cables with connectors at each end. A large measure of the "pull-proof" characteristic is present where the optical fiber has strength members, such as aramid yarn, incorporated into a coating or jacket surrounding the fiber or cable. These strength members are generally firmly attached, as by crimping, to the connector and any pull stresses are applied to the aramid fibers and not to the optical fiber which is, therefore, efficiently shielded from the stresses. However, strength members and materials represent an added expense to the cost of the connector.

A recent advance in the optical fiber art has been the development of what is commonly referred to as "robust" optical fiber, which has a core that is substantially the same size or diameter as that of more conventional fibers, but has a core cladding that is materially greater in diameter (or thickness) than the cladding of prior art fibers. Robust fiber has a core plus cladding diameter of approximately two hundred microns (200 $\mu$m) whereas conventional fiber has a diameter of one hundred twenty-five microns (125 $\mu$m). Robust fiber has many advantages over conventional fiber, as pointed out in the aforementioned related DiGiovanni et al application, among which is a sufficient fiber strength to resist many of the stresses encountered in use. As such, the robust fiber doesn't require the aramid strength members in general usage. However, there then is no separate strength member such as the aramid fiber to absorb high axial loads, and these loads, as well as other stresses are applied directly to the fiber. Further, with enough axial tension stress the ferrule of the connector can be pulled out of engagement with the ferrule of the other element in the connection, such as another connector, thereby disrupting low loss communication between the two, or, in extreme cases, resulting in complete disconnection.

SUMMARY OF THE INVENTION

The present invention, shown hereinafter as incorporated in a modified LC connector for optical fiber, more particularly for robust fiber, assures that the connector is substantially pull proof. While an LC connector is shown hereinafter in a preferred embodiment of the invention, it is to be understood that the principles and features of the invention are applicable to other types of connectors as modified.

The basic structure of an LC type connector includes a ferrule-barrel assembly for holding the end of an optical fiber which extends axially therethrough and a housing which holds the ferrule-barrel assembly. The housing has a latching arm for latching the connector in a mating connector adapter, for example. A coil spring member contained within the housing surrounds the barrel and bears against, for example, an interior wall of the housing and a flange portion of the barrel, thereby supplying forward bias to the ferrule-barrel assembly relative to the housing. The flange portion generally is shaped to be supported within an interior cavity or seat of the housing in any one of, for example, six rotational orientations with respect to the central axis of the fiber holding structures. A ferrule extends axially from the barrel member and contains a fiber end therein. The connector is thus tunable to any one of six possible rotational orientations by axially pulling the flange portion away from the seat sufficient to free it for rotation.

In a first illustrative embodiment of the invention, the fiber contained in the ferrule is a robust fiber having a diameter of at least 200 μm. The barrel includes a tubular portion extending rearwardly of the flange portion, with the ID thereof enlarged to accommodate the enlarged coated and jacketed fiber. In normal use the ferrule moves rearwardly from the polished end face to reach the optical plane (OP), a distance of approximately 0.020 inches, for example. However, the ferrule assembly can move rearwardly a much greater distance in a normal LC connector, and the opposing ferrule can follow up to approximately 0.020 inches to prevent decoupling. In a normal pull-proof connector the aramid yarns take up the tensile load. A cable retention tubular member which functions as a stop member is axially aligned with the barrel and fixedly mounted within the housing. The inner diameter (ID) of the retention member is less than the outer diameter (OD) of the tubular portion of the barrel so that when the barrel member is axially moved toward the rear of the connector, a distance of, for example, 0.025 inches the end of the tubular portion butts against the end of the retention member and is prevented from moving further. Thus, the connector of the invention is pull-proof, allowing a limited rearward axial movement of the barrel, and, hence, the ferrule without optical disconnect. The distance the ferrule is allowed to move is limited to the distance over which the spring loaded connecting ferrule or other device will follow the ferrule, retaining contact therewith. It should be noted that a tunable barrel as shown in the aforementioned Lampert and Lewis application can also be used for optical tuning, or it can be pre-tuned.

In a second embodiment of the invention the housing has a substantially rectangular or square window or opening in each of the side walls thereof, and a U-shaped retainer member in inserted therein and embraces a portion of the barrel, with one end butting against a shoulder of the flange on the barrel. The retainer member is axially movable within the opening until it butts against the rear edge of the opening, thus preventing further rearward movement of the barrel. The rear edge of the opening and the width of the U-shaped member are chosen to permit an axially rearward movement of the ferrule containing barrel flange of from 0.020 to 0.035 inches without disconnect.

An advantage of the arrangement of the second embodiment is that the retainer member may be removed to allow sufficient rearward movement of the barrel sufficient to free the barrel from its hexagonal seat in the housing for tuning by rotation thereof. After tuning, the retainer member may again be inserted into the window to embrace the barrel.

In both embodiments of the invention, the latching arm has one or two latching side protruding latches which are adapted to engage latching shoulders within the adapter when the connector is inserted therein and latched. In order to insert and withdraw the connector, the latching arm (and connector) is moved forward and depressed until the latches are out of engagement with the latching shoulder. Inasmuch as the latching arm is pivoted, the latches are swung in an arc when the arm is depressed, and there must be sufficient clearance space for the latches to be disengaged. This necessary clearance space encroaches on the backward travel space of the barrel/ferrule assembly, thus, limiting undesirably the amount of backward travel available. In the present invention, the latches are back cut so that only a narrow bottom strip portion thereof is adapted to bear against the latching shoulders, and as a result, the amount of clearance necessary is reduced, thereby permitting more backward travel of the ferrule/barrel assembly.

The principles and features of the present invention as set forth briefly hereinbefore, will be more readily apparent from the following detailed description, read in conjunction with the drawings.

DESCRIPTION OF THE DRAWINGS

FIG. 1 is an exploded perspective view of an LC type prior art connector;

FIG. 2 is a perspective view of the assembled connector of FIG. 1;

FIG. 5 is a cross-sectional elevation view of a second embodiment of the connector of the invention;

FIG. 6 is a cross-sectional elevation view of the barrel or flange member for use in the connector of FIG. 5;

FIG. 7 is a perspective view of the retainer member for use in the connector of FIG. 5;

FIG. 8 is a perspective view of a washer for use in the connector of FIG. 5;

FIG. 13 is a diagrammatic view of the latching arrangement of the invention as used in the connectors of FIGS. 4 and 5.

DETAILED DESCRIPTION

FIG. 1 is an exploded perspective view of the principal components of a standard LC type connector 11 and is shown here so that the structure of these components will be clear in the discussion hereinafter.

It is to be understood that while the ensuing discussion is directed to a modification of an LC conductor which comprises the principles and features of the present invention, other types of connectors, such as an ST®, SC, or others are amenable to modification to incorporate these principles and features.

Figure 3:
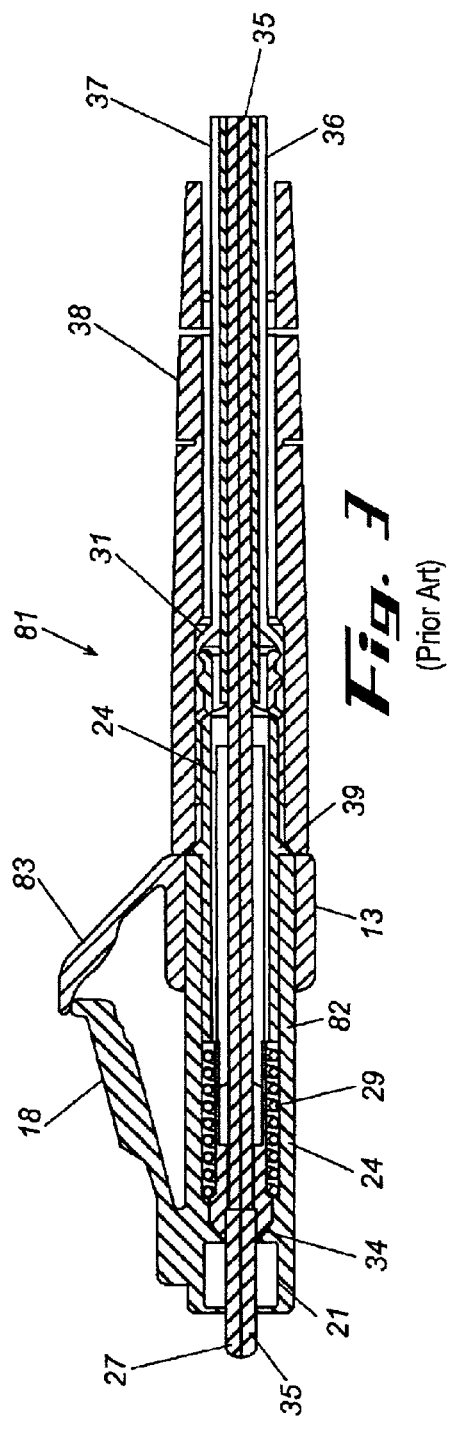
FIG. 3 is a cross-sectional elevation view of the connector of FIGS. 1 and 2.

Connector 11 comprises a plug housing formed of a front section 12 and a rear section 13 having an extended portion 14 which fits into section 12 and latches thereto by means of slots 16—16 in front section 12 and latching members 17—17. The housing in connector 11 can be assembled from two sections as shown by components 12 and 13, or in one long section with a separate trigger 83 as shown in FIG. 3. Members 12 and 13 are preferably made of a suitable plastic material. Member or front section 12 has a resilient latching arm 18 extending therefrom for latching the connector 11 in place in a receptacle or adapter. Arm 18 has latches 10 and 15 extending from either side thereof which are adapted to bear against latching shoulders, not shown, in a connector adapter or other receptacle for connector 11 as will be discussed in greater detail hereinafter. Member or section 13 has extending therefrom a resilient trigger guard 19, the distal end of which, when the two sections 12 and 13 are assembled, overlies the distal end of arm 18 to protect it from snagging and to prevent nearby cables from becoming entangled. Usually latch arm 18 and guard 19 are molded with their respective housing sections 12 and 13 and form "living hinges" therewith, which enable them to be moved up and down between latching and unlatching positions. However, the latch arm or guard can be a separate item. Front section 12 has a bore 21 extending therethrough which, when the parts are assembled, is aligned with a bore 22 extending through rear section 13. The bores 21 and 22 accommodate a ferrule-barrel assembly 23 which comprises a hollow tubular member 24 having an enlarge flange or barrel member 26 from which extends a ferrule 27 which may be made of a suitably hard material such as, preferably, ceramic, glass, or metal. Ferrule 27 has a bore 28 extending therethrough for receiving and holding an optical fiber therein. When the connector 11 is assembled, a coil spring 29 surrounds the tubular portion 24 of the assembly 23, with one end bearing against the rear surface of flange 26 and the other end bearing against for example an interior shoulder in rear section 13, as will best be seen in subsequent figures. Flange 26 which has a hexagonal shape 33 has a sloping front face 34 which has one or more notches 25 therein to accommodate a tuning tool such as is shown and described in U.S. Pat. No. 6,155,146 of Andrews, et al., incorporated herein by reference. The hexagonal shape 33 and sloping face 34 are adapted to seat within a configured front portion of bore 21 in member 12.

In practice, the uncoated portion of the optical fiber is inserted into bore 28 of ferrule 27 and adhesively attached thereto. Spring 29 is compressed as the sections 12 and 13 are connected and supplies a forward bias against the rear of flange 26 and, hence, to ferrule 27. This arrangement of ferrule 27 and spring 29 is considered to be a "floating" design. Prior to connection, the spring 29 causes ferrule 27 to overtravel its ultimate connected position. When connector 11 is connected within a suitable adapter and the distal end of ferrule 27 butts against the corresponding ferrule end of another connector or of other apparatus, spring 29 will be compressed, thereby allowing backward movement of ferrule 27 to where its end, and the end of the abutting ferrule, lie in the optical plane (transverse centerline) between the two connectors.

The rear end of rear section 13 has a ridged member 31 extending therefrom for attachment of optical fiber cable and a strain relief boot, not shown. For protection of the distal end of ferrule 27 during handling and shipping, a protective plug 32, sized to fit within bore 21, is provided. FIG. 2 depicts the assembled connector 11 in its shipping or handling configuration.

FIG. 3 is a cross-sectional view of the connector 81 which is essentially like connector 11, and shows one end of a jumper cable 36 having aramid strength fibers 37 passing through a protective strain relief boot 38 into one piece housing 82 and the cable is stripped to the fiber 35 which terminates in ferrule 27, to which it is cemented. The connector 81 of FIG. 3 differs slightly from that of FIGS. 1 and 2 in that part of a tubular member 39 is crimped onto ridged member 31 which is affixed to housing 82, as shown. The strength fibers 37 are crimped or otherwise attached between ridged member 31 and 39 so that any pull stress on jumper cable 36 is transferred from strength members 31 to the housing 82 body of connector 81, and not to the optical fiber 35. A separate trigger 83 is made from a living hinge plastic material.

Figure 4:
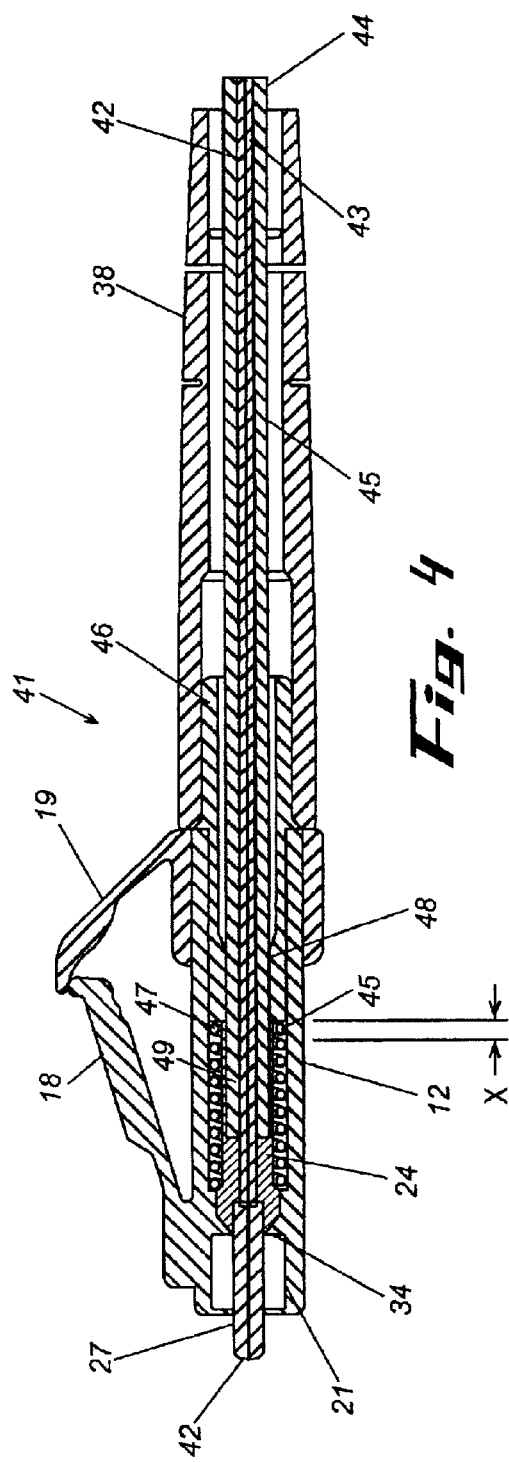
FIG. 4 is a cross-sectional elevation view of a first embodiment of the connector of the present invention.

In FIG. 4 there is shown, in cross-section, a first preferred embodiment of the present invention. For simplicity, like parts bear the same reference numerals as in the preceding figures.

The connector 41 of FIG. 4 is configured for use with a buffered robust optical fiber 42 having a buffering layer 43 and jacket 44 thereon forming jacketed cable 45 such as a jumper cable connectorized at each end. A tubular cable retention member 46 is positioned in connector 41 and affixed to the front housing 82 thereof. Retention member 46 has, at its front end 47 designated with an extension line, a restricted passageway 48 of a diameter sufficient to permit passage of the jacketed cable 45. The rear portion of tubular barrel member 24 likewise has, in the rear portion thereof, a bore 49 sufficient to accommodate the jacketed cable 45 and the front portion thereof accommodates only the buffered fiber 42, 43. In accordance with the present invention, the rear end of tubular member 24 has an outside diameter greater than the inside diameter of bore 48 in retention member 46, and the rear end 45 of member 24 is spaced from the front end of member 46 a distance sufficient to allow limited translational movement X of tubular member 24 for example of 0.020 inches to 0.035 inches before the rear end thereof butts against the front face of member 46 and further translational movement is prevented. Inasmuch as the jacketed cable 45 has no strength members, the robust fiber 42 itself must supply sufficient tensile strength, as was discussed hereinbefore, since longitudinal "tensile" stresses on the cable are applied directly to the fiber. Thus, the fiber, itself, and the limited translational movement X thereof serve to make the connector pull-proof. Tests have shown that the robust fiber is capable of withstanding tensile forces of ten pounds or more, which is far more than is normally encountered in normal usage.

In FIG. 5 there is shown a second embodiment 51 of the invention. To avoid confusion, like parts are given the same reference numerals as their counterparts in the preceding figures. In the embodiment 51 of FIG. 5, the cable retention member 52 has, at its rearward end, grooves 53 for affixing the cable jacket 44 thereto. The end surface of the forward end of member 52 forms a seat for spring 29. The flange or barrel member 54, having an angled front face 34, is affixed to an elongated tubular member 24 such as is shown in FIG. 1. As seen in FIG. 6, barrel member 54 has a first portion 56 having a bore 57 into which ferrule 27 is fixed and which has a rear shoulder 58 which adjoins a second portion 59 of lesser diameter than portion 56 which has a second shoulder 61 where it adjoins a third portion 62 of still lesser diameter. Portions 59 and 62 have a bore 63 extending therethrough which accommodates the buffered fiber, as shown in FIG. 5.

Figure 10:
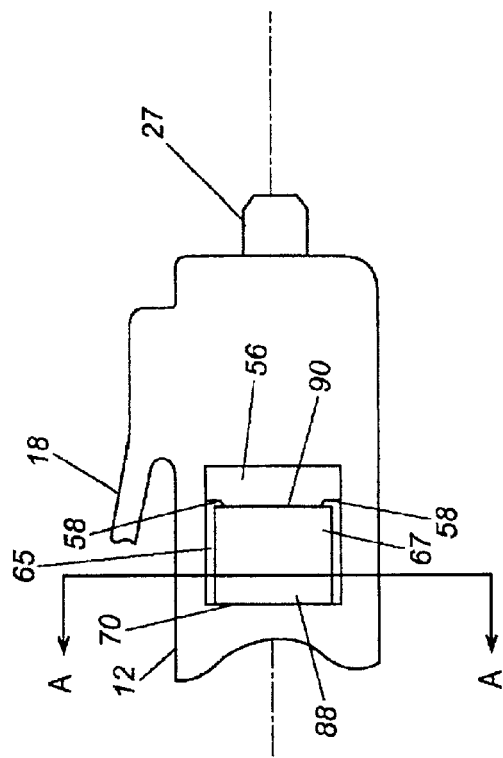
FIG. 10 is a partial elevation view of the front portion of the connector of the second embodiment thereof showing the position of the elements in the presence of axial stress.
Figure 11:
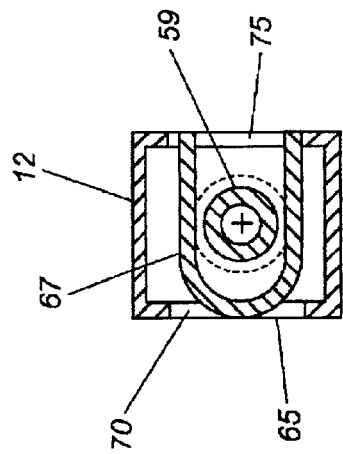
FIG. 11 is a cross-sectional view of the connector along the line A—A of FIG. 10.
Figure 9:
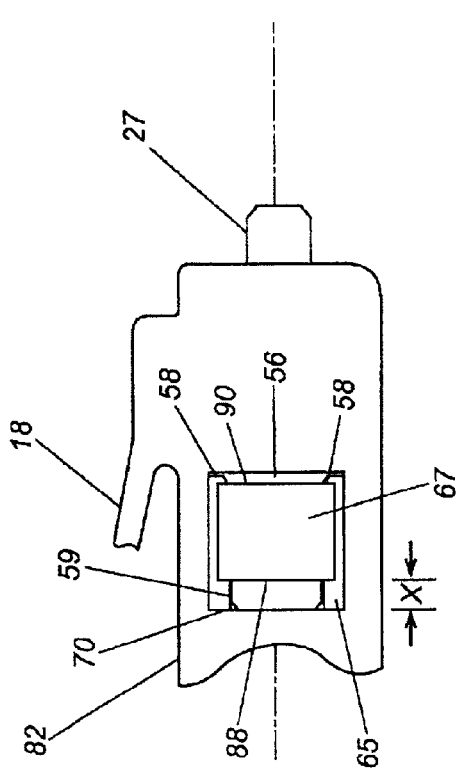
FIG. 9 is a partial elevation view of the front portion of the connector of the second embodiment thereof showing the position of certain elements in the absence of axial stress.

A slightly cupped washer 64 is shown in FIG. 8 is located between the forward end of spring 29 and shoulder 61 and has a hole 66 of a diameter sufficient to pass third portion 62 of barrel member but is smaller than the outside diameter of portion 59. A movable U-shaped retainer member 67 embraces second portion 59 and is movable therealong. Retainer member 67 is inserted into housing 82 through a rectangular opening 65 in one side of the housing 82, as best seen in FIGS. 9, 10, and 11, such that the bottom of the U-shaped retainer 67 flush with the outer surface of the side of housing 82, as shown in FIG. 11. A second opening 75 in the opposite wall of housing 82 has the legs of member 67 extending therein. When a pulling force is exerted on fiber 45, barrel member 54 is pulled rearwardly and member 67 is likewise moved rearwardly by shoulder 58 butting against leg 90 of member 67, until leg 88 butts against the rear edge 70 of opening 65, as shown in FIG. 10. When member 67 butts against edge 70, no further rearward movement occurs. As can be seen in FIG. 9, when no pulling stress is exerted, the rear end of member 67 is spaced from the rear edge 70 of opening 65 a distance X which may be 0.020 to 0.035 inches and which represents the amount of rearward movement possible for the barrel 34 and hence ferrule 27, without disconnection. Thus, opening 65 and its rear edge 70 function as a stop member for rearward movement of ferrule 27, whereas in the embodiment of FIG. 4, the front end (as viewed in FIG. 4) of cable retention member 46 functions as the stop member. It is to be understood that the length A of member 67, which is preferably made of a suitable metal, may be varied, depending upon how great a rearward movement of barrel 54 is desired.

From the foregoing, it can be seen that in both embodiments of the invention, a pull-proof connector is realized by allowing some rearward movement of the ferrule that is insufficient to cause disconnect, but which is sufficient to withstand tension stress under normal conditions.

Figure 12:
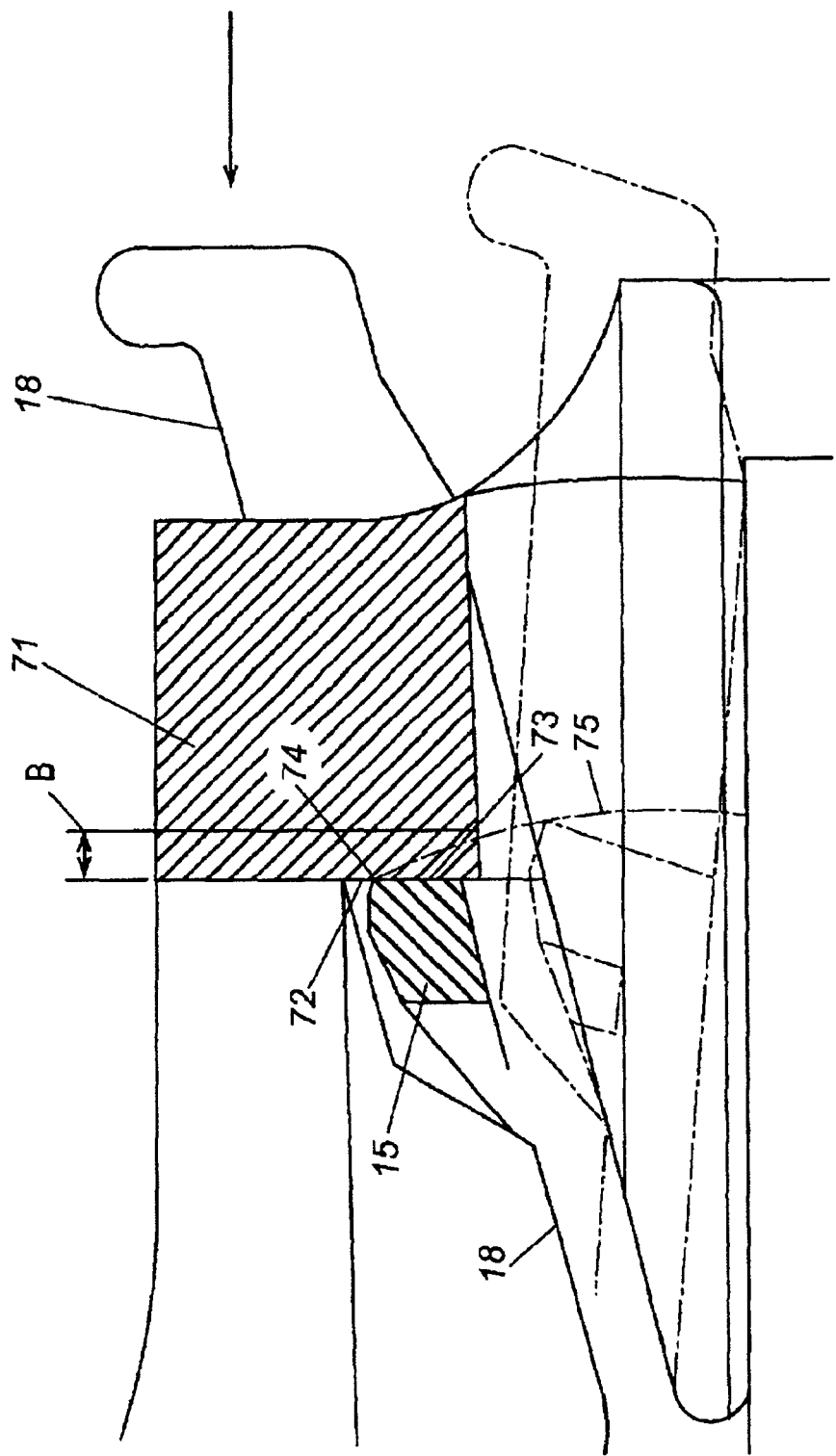
FIG. 12 is a diagrammatic view of the connector latching arrangement as used in the prior art.
Figure 11:
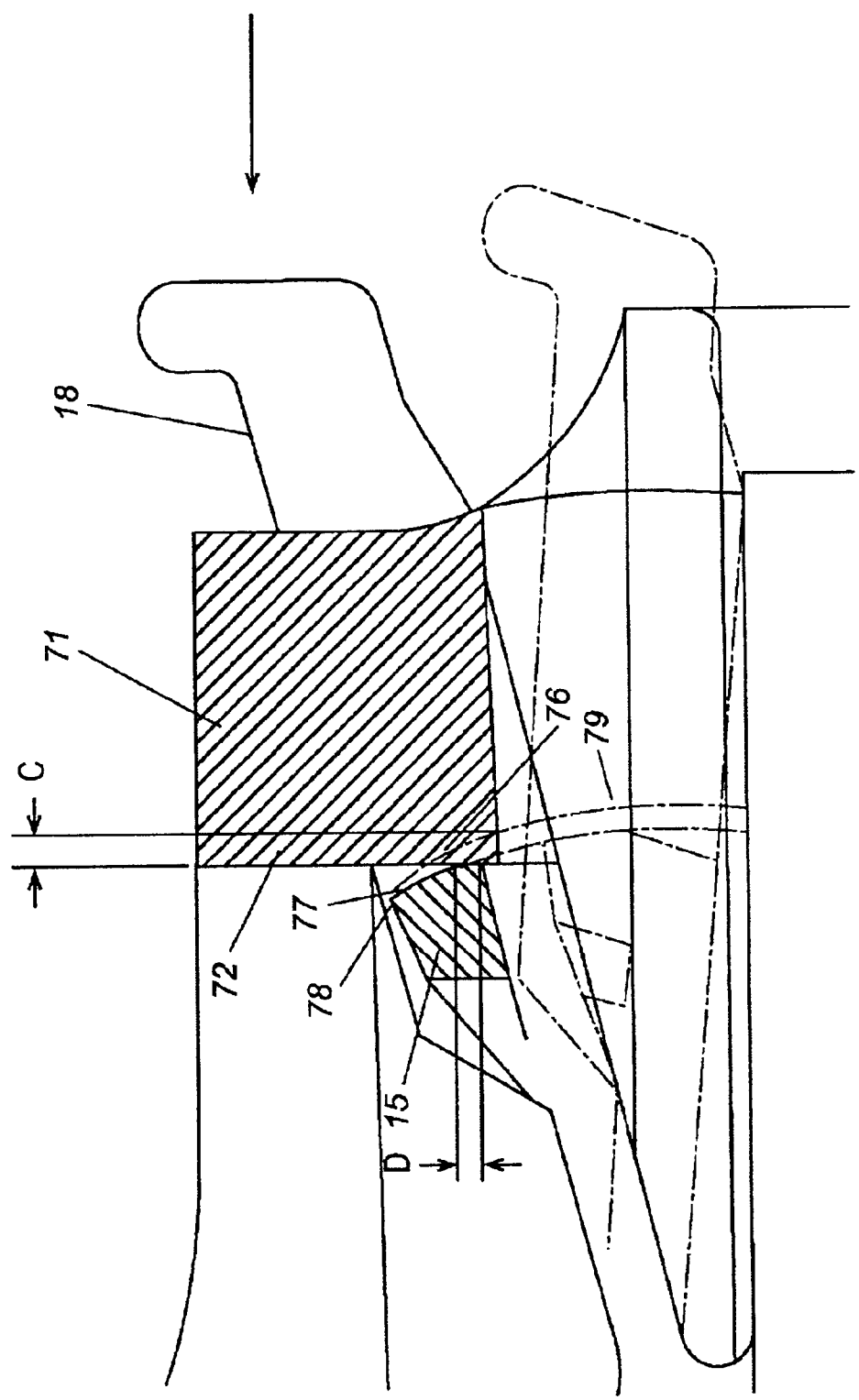

As was pointed out heretofore, the latches 10 and 15 extending from the sides of the latching arm 18 engage latching shoulders within the adapter or other mating member. In order to disengage the latch, and hence the connector, the connector must be pushed forward and the latching arm depressed until the latches are disengaged from the latching shoulder. This forward movement encroaches upon the space available for rearward movement of the barrel/ferrule assembly, thus limiting undesirably, the usable space that is available for the pull-proof feature. In FIG. 12, which is a diagrammatic view of the latching feature, the usual or typical prior art latching is shown. The latching shoulder 71 of the adapter (not shown) has a latching surface 72 which is engaged by the latching surface 73 of the latch 15, as shown. For unlatching to occur, the surface 73, including the upper edge 74 thereof must completely clear the surface 72 of shoulder 71 as the arm 18 is depressed for the connector to be removed. Because the arm 18 is pivoted on the connector, as shown in FIG. 1., upper edge 74 of the latching surface 73 of latch 15 will follow an arced path as shown by the dot-dashed line 75, thus the arm 18 (and connector) must be moved forward (in the direction of the arrow) a distance B for upper edge 74 to clear surface 72 of shoulder 71. Usually, the distance B is approximately 0.015" which, therefore encroaches on the pull-proof available space.

In accordance with the present invention, this necessary forward movement is materially reduced, as diagrammatically shown in FIG. 13. The arrangement, i.e., limited X travel, shown in FIG. 13 applies to both embodiments. In FIG. 13, it can be seen that latch 15 has an engaging surface strip 76 of a dimension D and, extending from the strip 76 to the top of latch 15, a cutback portion 77 which does not engage surface 72 of shoulder 71. Thus, the arc which the top edge 78 of latch 15 describes as shown by dot-dash line 79 requires materially less forward displacement C in order to clear shoulder surface 72. It can be seen in comparing FIGS. 12 and 10 that C is approximately one-half of B. It has been found that the value of C of approximately 0.008 inches, where B is approximately 0.015 inches in effect adds 0.007 inches to the usable pull-proof rearward movement of the ferrule 27, while a value of D (the width of the engaging strip) of approximately 0.006 inches is sufficient to provide adequate latching. Thus, preferably, each embodiment of the invention has a latching arrangement as shown in FIG. 13. The angle of cutback portion 77 is shown as being approximately thirty degrees (30°) but it can be more or less than this angle depending on the particular connector geography and dimensions involved. It is also feasible to make surface 77 curved, so long as the foregoing applies.

It is to be understood that the present invention, which is shown as for use with robust optical fiber, can also be used with conventional optical fiber also, as well as variations thereof.

It is to be understood that the various features of the present invention might be incorporated into other types of connectors, and that other modifications or adaptations might occur to workers in the art. All such variations and modifications are intended to be included herein as being within the scope of the present invention as set forth. Further, in the claims hereinafter, the corresponding structures, materials, acts, and equivalents thereof and of all means or step-plus-function elements are intended to include any structures, materials, or acts for performing the functions in combination with other elements as specifically claimed.

What is claimed is:

1. A connector for use with robust optical fiber, said connector comprising:

a housing member having a forward portion and a rear portion and first and second side walls and a top wall joining said side walls;

a barrel member having a ferrule mounted therein for connection to another component and contained in said forward portion, said barrel member having a flange having a first outside diameter and a tubular portion extending rearwardly therefrom having a second outside diameter less than said first outside diameter;

a bore extending through said barrel member;

a stop member for limiting rearward movement of said barrel member within said housing to a distance less than that distance causing disconnection of said ferrule from the another component;

a resilient latching arm extending from said top wall of said housing at an angle thereto, said latching arm having at least one latch extending from a side thereof, said latch having a front surface for engaging latching shoulders within a component for containing said connector and top and bottom surfaces; and said front surface of said latch being in the form of a narrow shoulder engaging strip adjacent the bottom of said latch and having a cut back portion extending from said strip to said top surface.

2. A connector as claimed in claim 1 wherein said cutback portion is at an angle of approximately thirty degrees.

3. A connector as claimed in claim 1 and further including an optical fiber to which said connector is attached.

4. A connector as claimed in claim 3 wherein said fiber is a jumper cable.

5. A connector as claimed in claim 3 wherein said fiber is a robust fiber having an outer diameter of approximately 200 microns or more.

6. A connector for use with robust optical fiber, said connector comprising:

a housing member having a forward portion and a rear portion;

a barrel member having a ferrule mounted therein for connection to another component contained in said forward portion, said barrel member having a flange having a first outside diameter and a tubular portion extending rearwardly therefrom having a second outside diameter less than the first outside diameter;

a bore extending through said barrel member;

a stop member for limiting rearward movement of said barrel member within said housing to a distance less than that causing disconnection of said ferrule from the another component, said distance being within the range of 0.020 inches to 0.035 inches.

7. A connector for use with robust optical fiber, said connector comprising:

a housing member having a forward portion and a rear portion;

a barrel member having a ferrule mounted therein for connection to another component contained in said forward portion, said barrel member having a flange having a first outside diameter and a tubular portion extending rearwardly therefrom having a second outside diameter less than the first outside diameter;

a bore extending through said barrel member;

a stop member for limiting rearward movement of said barrel member within said housing to a distance less than that causing disconnection of said ferrule from the another component;

said stop member comprising a cable retention member within said housing having a bore therein through which the cable passes, said retention member having a front end and a said bore having a restricted inside diameter portion adjacent said front end, said inside diameter being less than said second outside diameter of said tubular portion of said barrel.

8. A connector for use with robust optical fiber, said connector comprising a housing member having a forward portion and a rear portion;

a barrel member having a ferrule mounted therein for connection to another component contained in said forward portion, said barrel member having a flange having a first outside diameter and a tubular portion extending rearwardly therefrom having a second outside diameter less than the first outside diameter;

a bore extending through said barrel member;

a stop member for limiting rearward movement of said barrel member within said housing to a distance less than that causing disconnection of said ferrule from the another component;

a movable retainer member embracing said tubular portion of said barrel member and free to move longitudinally with respect thereto;

wherein said housing has an opening in a side wall thereof through which said retainer member is insertable into said housing;

wherein said retainer member has a U-shape.

9. A connector as claimed in claim 8 wherein a bend in the U-shaped retainer member is situated within said housing when said retainer member is in its tubular portion embracing position.

10. A connector as claimed in claim 9 wherein said opening has a rearward edge and a front edge, said stop member being said rearward edge.

* * * * *